US012617294B2

(12) United States Patent
Betro' et al.

(10) Patent No.: US 12,617,294 B2
(45) Date of Patent: May 5, 2026

(54) PROCESS FOR CONTROLLING AN ELECTRIC MOTOR OF A MOTOR VEHICLE AND MOTOR VEHICLE WITH A CONTROL UNIT CONFIGURED TO CARRY OUT THE PROCESS

(71) Applicant: FERRARI S.P.A., Modena (IT)

(72) Inventors: Roberto Betro', Modena (IT); Giorgio Bisceglie, Modena (IT); Valerio Dodet, Modena (IT); Ugo Sitta, Modena (IT)

(73) Assignee: FERRARI S.P.A. (IT)

( * ) Notice: Subject to any disclaimer, the term of this patent is extended or adjusted under 35 U.S.C. 154(b) by 47 days.

(21) Appl. No.: 18/672,617

(22) Filed: May 23, 2024

(65) Prior Publication Data

US 2024/0391328 A1      Nov. 28, 2024

(30) Foreign Application Priority Data

May 25, 2023    (IT) ........................ 102023000010545

(51) Int. Cl.
    B60L 15/20         (2006.01)
    B60L 3/00          (2019.01)
(52) U.S. Cl.
    CPC ......... B60L 15/2045 (2013.01); B60L 3/0061 (2013.01); B60L 2240/421 (2013.01); B60L 2240/423 (2013.01); B60L 2240/429 (2013.01)
(58) Field of Classification Search
    CPC .............. B60L 15/2045; B60L 3/0061; B60L 2240/421; B60L 2240/423; B60L 2240/429; B60L 2240/80; B60L 15/20; B60L 15/025
    See application file for complete search history.

(56) References Cited

U.S. PATENT DOCUMENTS

2019/0111928 A1*   4/2019   Son ................. B60W 30/18063

FOREIGN PATENT DOCUMENTS

CN        112937313 A      6/2021
DE      102010043492 A1    5/2012
FR        3043604 A1       5/2017

OTHER PUBLICATIONS

Search Report issued in Italian Patent Application No. 102023000010545.

* cited by examiner

*Primary Examiner* — Rodney A Butler
(74) *Attorney, Agent, or Firm* — The Belles Group, P.C.

(57)      ABSTRACT

A process for controlling an electric motor is disclosed. The process includes determining a target torque to be delivered by the electric motor, associating the target torque with a control target for a control input of the electric motor according to a mapping between the target torque and the control target, acquiring a feedback signal of the control input, controlling the electric motor with an error between the feedback signal and the control target, identifying a critical condition where the error diverges, determining a safety control target corresponding to a safety target torque according to the mapping, where the safety target torque is reduced relative to the target torque, and replacing the error when the critical condition is identified with a safety error between the feedback signal and the safety control target.

11 Claims, 3 Drawing Sheets

PROCESS FOR CONTROLLING AN ELECTRIC MOTOR OF A MOTOR VEHICLE AND MOTOR VEHICLE WITH A CONTROL UNIT CONFIGURED TO CARRY OUT THE PROCESS

CROSS-REFERENCE TO RELATED APPLICATION

This patent application claims priority from Italian patent application no. 102023000010545 filed on May 25, 2023, the entire disclosure of which is incorporated herein by reference.

TECHNICAL FIELD

The invention relates to a process for controlling an electric motor of a motor vehicle, as well as a motor vehicle comprising a control unit configured to carry out the process.

BACKGROUND

Some motor vehicles include electric motors as an exclusive means of propulsion (called fully electric motor vehicles) or as an auxiliary means of propulsion (called hybrid motor vehicles with at least one electric motor). Usually, an electric motor of a motor vehicle is controlled in feedback based on a target torque delivered, which in turn is obtained as a function of a corresponding driver demand, e.g., an acceleration demand, in particular which can be expressed by pressing an accelerator pedal.

In more detail, a motor vehicle control unit converts the driver's demand into the target torque according to known algorithms. The target torque can be limited as a function of an angular motor output speed according to a torque-speed characteristic curve. In particular, for each value of the angular output speed, the target torque is equalled to the maximum deliverable torque for that same value according to the characteristic curve if the target torque is greater than such a maximum deliverable torque. The characteristic curve is typically calibrated experimentally on the bench with reference to maximised performance. This especially applies to electric motors supplied for sports cars.

In more detail, the target torque translates into a target electric current which enters into a closed-loop control law, or algorithm, of the motor, where the variable controlled in feedback is precisely the electric current supplying the motor. More in particular, the closed-loop control law can, for example, be of the proportional-integrative type. The translation of the target torque into the target current can occur by means of specific mappings or mathematical functions, which can be theoretical in nature (e.g., models known by the acronyms MTPA, FW, MTPV, and the like) or more preferably experimental.

In any case, each manufactured electric motor will have its own characteristics which differ relative to the others and, above all, will be able to operate under very different conditions, e.g., temperature, health of the power supply network, surrounding humidity, etc. Given the pursuit of maximised performance, the variability of operating conditions, and the ideal nature of the aforementioned mapping with respect to the actual link between torque and electric current, there is a real risk that the target electric current will be unattainable by means of the designed closed-loop control law. This would mean that the error given by the difference between the actual current and the target electric current would tend to diverge, so that a complete loss of control of the motor vehicle could occur with consequent danger to the driver and for his/her passengers.

Therefore, some motor vehicles are provided with instruments for recognising an error divergence condition and for commanding a motor vehicle stop or a speed limiter insertion. Although such instruments are important for safety matters, the insertion of the speed limiter or, even worse, the stopping of the motor vehicle, is a major inconvenience, not least because it forces the motor vehicle owner to remedy the situation by taking the motor vehicle to a garage. Therefore, the need is felt to overcome the drawback just mentioned, while not compromising or jeopardising the safety of the motor vehicle.

An aim of the invention is to fulfil the above requirement, preferably in a simple and repeatable manner.

DESCRIPTION OF THE INVENTION

In one aspect, the invention can be a process for controlling an electric motor of a motor vehicle, the process comprising the steps of:

a. determining a target torque to be delivered by the electric motor according to a corresponding demand of a driver of the motor vehicle;

b. associating the determined target torque with at least one corresponding control target for a control input of the electric motor according to a mapping between the target torque and the control target;

c. acquiring a feedback signal of the control input;

d. controlling the electric motor according to a control law as a function of an error indicative of a difference between the feedback signal and the control target, wherein the control law is configured to induce convergence of the error to a zero value;

e. identifying a critical condition where the error diverges from the zero value during step d.;

f. determining a safety control target corresponding to a safety target torque according to said mapping, wherein the safety target torque is reduced relative to the target torque determined in step a.; and g. replacing said error in step d., when the critical condition is identified according to step e., with a safety error indicative of a further difference between the feedback signal and the safety control target.

In one aspect, the invention can be a motor vehicle comprising an electric motor and a control unit configured to carry out the process including steps a.-g. directly above.

In one aspect, the invention can be a process for controlling an electric motor of a motor vehicle, the process comprising determining a target torque to be delivered by the electric motor according to a corresponding demand of a driver of the motor vehicle, associating the determined target torque with at least one corresponding control target for a control input of the electric motor according to a mapping between the target torque and the control target, acquiring a feedback signal of the control input, controlling the electric motor according to an algorithm as a function of an error indicative of a difference between the feedback signal and the control target, wherein the algorithm is configured to induce convergence of the error to a zero value, identifying a critical condition where the error diverges from the zero value during said controlling step, determining a safety control target corresponding to a safety target torque according to said mapping, wherein the safety target torque is reduced relative to the determined target torque, and replacing said error in said controlling step, when the critical condition is identified according to said identifying step, with a safety error indicative of a further difference between the feedback signal and the safety control target. In one aspect, the invention can be a motor vehicle comprising an electric motor and a control unit configured to carry out this process.

BRIEF DESCRIPTION OF THE DRAWINGS

In the following, embodiments of the invention are described for a better understanding thereof by way of non-limiting examples and with reference to the accompanying drawings, in which.

DETAILED DESCRIPTION OF THE INVENTION

Figure 1:
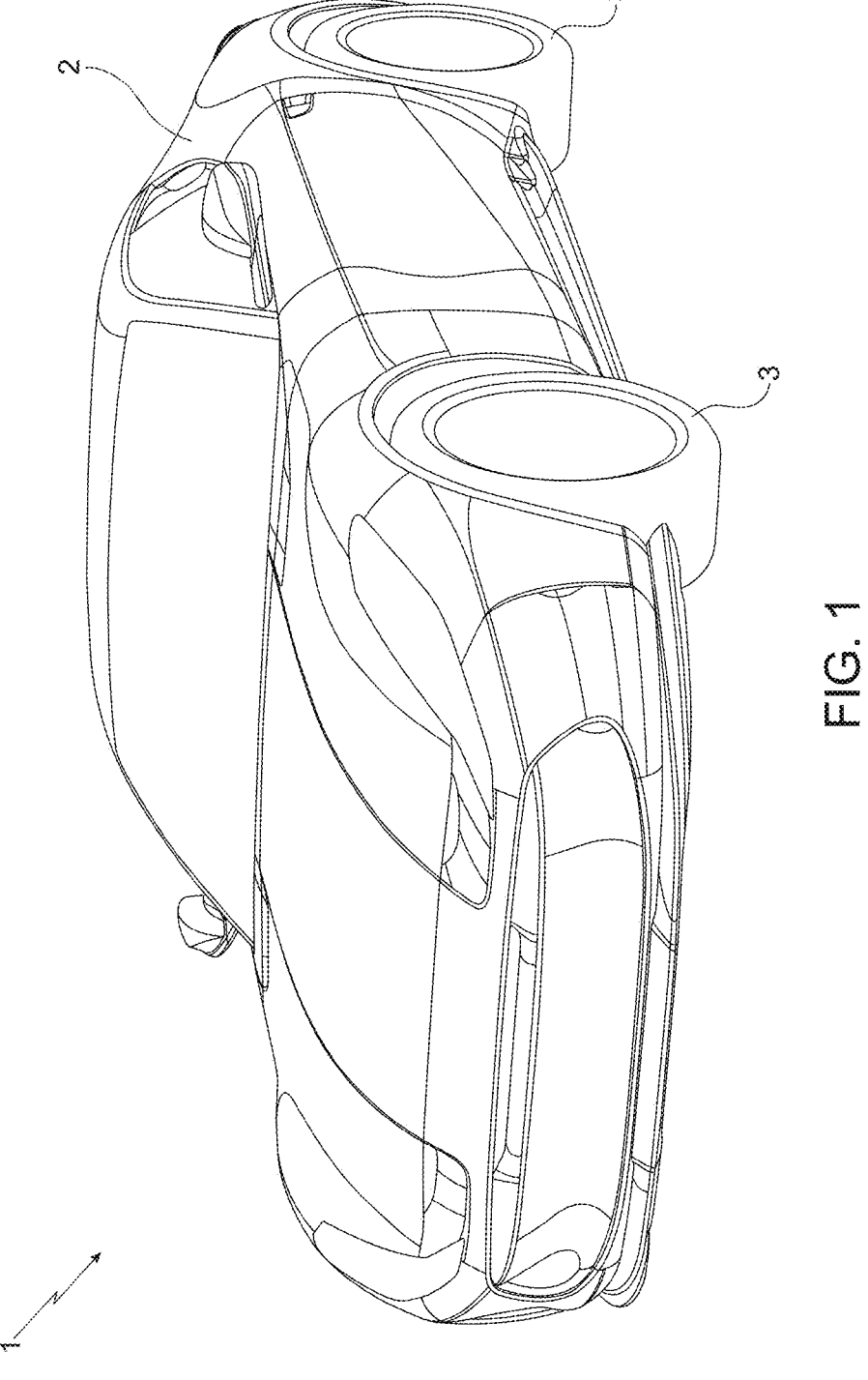
FIG. 1 is a perspective view of a motor vehicle according to the invention.

In FIG. 1, reference number 1 is used to denote a motor vehicle as a whole.

The motor vehicle 1 comprises a chassis 2 and a plurality of wheels 3 with respect to which the chassis 2 is suspended by means of suspensions of a known type and not illustrated.

The motor vehicle 1 further comprises an electric motor 4 (FIG. 2), in particular carried by the chassis 2. In the illustrative and non-limiting embodiment illustrated, the electric motor 4 is supplied with alternating electric current, in particular having three distinct phases.

The electric motor 4 is connected to at least one pair of wheels 3 by transmission means of a known type and not illustrated, whereby the electric motor 4 is a propulsion organ of the motor vehicle 1, viz., an organ configured to set the wheels 3 in rotation and consequently make the motor vehicle 1 advance.

The motor vehicle 1 further comprises a control unit 5 configured to control the electric motor 4.

Figures 3, 4:
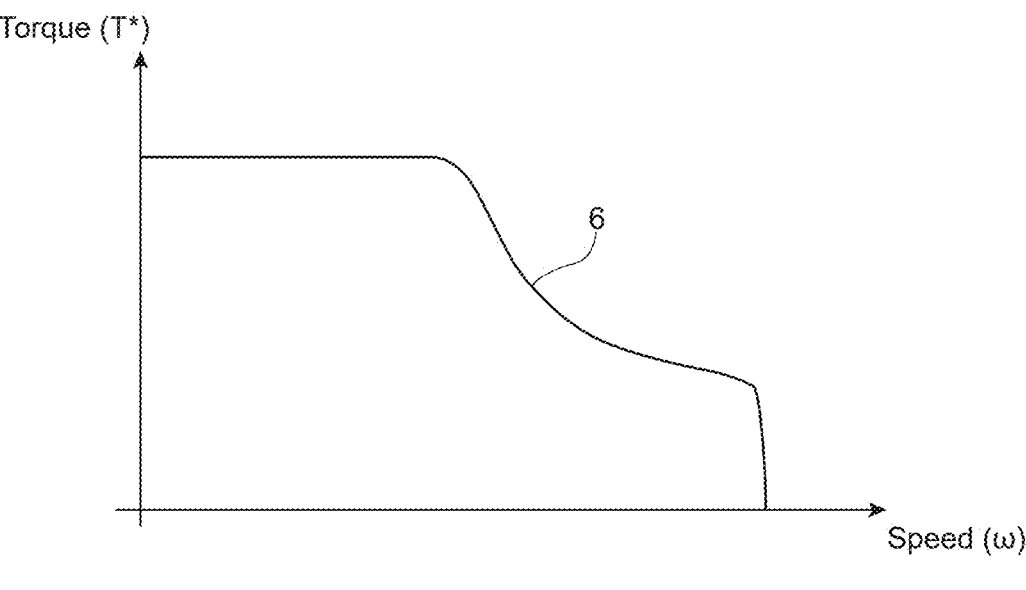
FIGS. 3 and 4 are graphs depicting possible characteristic torque-speed curves of an electric motor of the motor vehicle in FIG. 1.

The control unit 5 has or provides a characteristic curve 6 of the electric motor 4, an example of which is illustrated in FIG. 3 by means of a continuous line.

The curve 6 defines or is a representation of a functional relationship or link, viz., a mathematical function, which links a rotational speed or output speed of the motor 4 and a torque which can be delivered by means of the motor 4.

In the following, the rotation speed of the motor 4 will be more simply indicated as the speed $\omega$ of the motor 4 or even more simply as speed $\omega$, for the sake of brevity.

As can be seen in FIG. 3, the curve 6 is defined by a plurality of values of the maximum torque which can be delivered by the motor 4 at or in association with respective speed $\omega$ values.

The curve 6 can be obtained, for example, experimentally by testing the motor 4 on a test bench, viz., under experimental operating conditions; therefore, in general, the curve 6 is not an accurate expression of the actual maximum torque which can be delivered, as the latter can vary from motor to motor and based on actual operating conditions.

The curve 6 can be stored in the control unit 5.

For example, the curve 6 can be considered an optimised characteristic curve where the torque values associated with the speed $\omega$ values would constitute target torque values or target torque to be delivered by means of the motor 4.

In reality, the control unit 5 is configured to determine the target torque as a function of a corresponding demand from a driver of the motor vehicle 1.

The term "driver" can be interpreted broadly to include not only a natural person but also a virtual entity, e.g., forming part of the control unit 5, carrying out an autonomous driving function of the motor vehicle 1.

The driver's demand could be a torque demand for the wheels 3 or an acceleration demand of the wheels 3 or a power demand for the wheels 3. In other words, the driver's demand essentially requires a desired value for a quantity causally associated with the torque delivered by the motor 4.

In more detail, the driver's demand can be defined by a signal emitted by a control device (not illustrated) of the motor vehicle 1, such as an accelerator pedal, an alternative device having the same function as the accelerator pedal, or even a portion of the control unit 5, for example in the case of autonomous driving of the motor vehicle 1.

The control device is coupled to the control unit 5, whereby the control unit 5 is configured to acquire the signal defining the driver's demand and emitted by the control device.

The control unit 5 therefore determines the target torque by translating the driver's demand into the target torque itself, e.g., based on operating parameters of the motor vehicle 1, in particular according to algorithms of known type and therefore not described in detail.

The curve 6 can be used by the control unit 5 to limit the target torque.

In particular, for example in order to limit the target torque, the control unit 5 is configured to determine the speed $\omega$ of the motor 4.

For example, the control unit 5 could acquire signals of one or more quantities indicative of the speed $\omega$, in particular generated by one or more transducers of the motor vehicle 1.

Alternatively or additionally, the control unit 5 could estimate the speed $\omega$ based on signals that the control unit 5 itself emits to control the motor 4.

Still alternatively, the control unit 5 could determine the speed $\omega$ as a target to be reached based on any predefined criterion, e.g., a performance maximisation criterion of the motor vehicle 1.

Furthermore, by means of the curve 6, the control unit 5 is configured to determine a target torque limit corresponding to the determined speed $\omega$, viz., the torque value of the curve 6 associated with the determined speed value $\omega$.

Thus, the curve 6 defines the target torque limit, viz., an upper limit for the target torque, as a function of the speed $\omega$. In other words, the curve 6 is a representation of a function which associates values of the speed $\omega$ or the speed $\omega$ with values of the target torque limit.

The control unit 5 is configured to limit the target torque to the target torque limit if the target torque exceeds such a target torque limit.

Therefore, the target torque could possibly also coincide, although not necessarily, with the function of the speed $\omega$ according to the curve 6, in particular when the driver's demand is associated with maximum motor vehicle performance 1.

Figure 2:
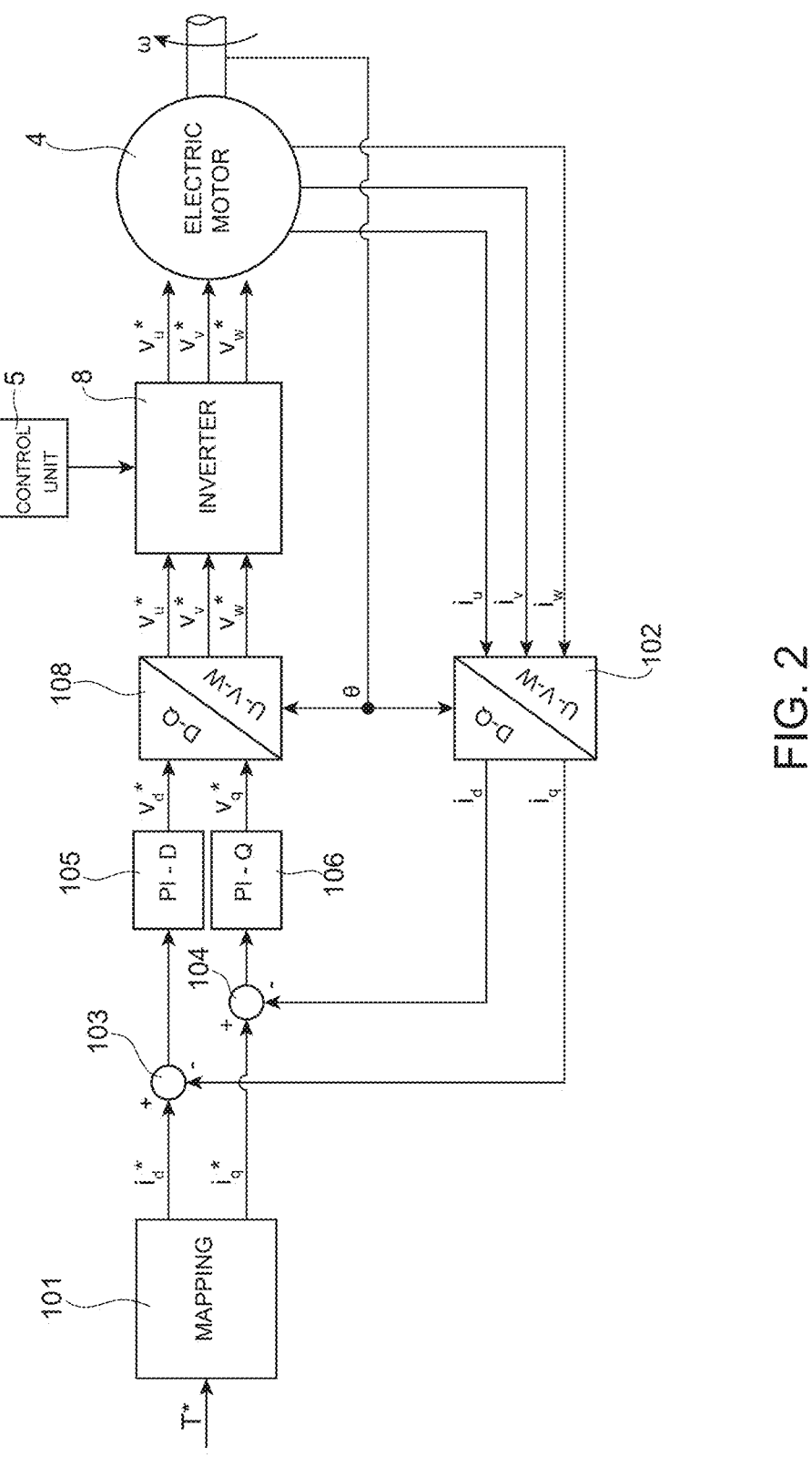
FIG. 2 is a block diagram illustrating steps of a process according to the invention.

In FIG. 2, the target torque is indicated by the symbol T* as the input of a function block 101.

The control unit 5 (block 101) is configured to associate the target torque T* with corresponding control targets $i^*_d$, $i^*_q$ for relative control inputs of the motor 4. Specifically, the block 101 represents a mapping between the target torque T* and the control targets $i^*_d$, $i^*_q$. The association of the target torque T* with the control targets $i^*_d$, $i^*_q$ occurs by means of the mapping.

The control inputs preferably comprise the electric current for supplying the motor 4, viz., the electric current which, in use, supplies the motor 4.

Specifically, the control inputs comprise a direct component and a quadrature component of the electric current for supplying the motor 4; the targets for the direct component and the quadrature component are the control targets $i^*_d$, $i^*_q$, respectively.

However, the representation of the electric current described herein by means of the direct and quadrature components is illustrative and optional; the electric current could have been represented by means of three components (e.g., corresponding to the three phases of the alternating current) or even by means of only one component, in the latter case defining a single control input associated with a single control target, without losing generality.

The mapping could be any mapping of known type, e.g., defined by a mathematical function among those known by the acronyms MTPA ("Maximum Torque Per Ampere"), MPTV ("Maximum Torque Per Volt"), FW ("Flux Weakening"), and the like.

Preferably, the mapping comprises an experimental table, viz., a table obtained from data produced by means of experiments on the motor 4. For example, the association of the target torque T* with the control objectives $i^*_d$, $i^*_q$ can occur in this case by interpolating the table as a function of the target torque T*.

For each control input, the control unit 5 is configured to acquire or determine a corresponding feedback signal of the control input itself.

In more detail, the motor vehicle 1 comprises one or more transducers configured to detect the electric current supplying the motor 4, i.e., the power supply current of the motor 4.

In particular, the transducers detect the three phases $i_u$, $i_v$, $i_w$ of the power supply current.

Furthermore, the transducers are configured to generate one or more signals related to the detected electric current. In particular, the transducers generate three signals respectively comprising information related to the three phases $i_u$, $i_v$, $i_w$ of the power supply current.

According to the illustrative and non-limiting embodiment of FIG. 2, the control unit 5 is also configured to determine a rotation angle θ corresponding to or associated with the speed ω, e.g., by carrying out a numeric integral of the speed ω over time.

The control unit 5 is configured to transform (function block 102 in FIG. 2) the signals related to the three phases $i_u$, $i_v$, $i_w$ into two signals $i_d$, $i_q$ of the direct and quadrature power supply current, respectively. Here, the signals $i_d$, $i_q$ define the feedback signals of the control inputs.

The transformation of the block 102 can be a transformation known as the Park transform or the direct-quadrature-zero transformation.

The control unit 5 is configured to calculate for each of the control objectives $i^*_d$, $i^*_q$ a corresponding error indicative of a difference with the corresponding feedback signal.

With reference to the embodiment of FIG. 2, the function blocks 103, 104 represent the error calculation, respectively, here specifically defined as the respective differences of the control target $i^*_d$ with the signal $i_d$ and of the control target $i^*_q$ with the signal $i_q$.

The control unit 5 is configured to control the motor 4 according to a control law as a function of the calculated errors. In turn, the control law is configured to induce a convergence of the calculated errors towards a zero value, viz., to cause the respective differences of the control objectives $i^*_d$, $i^*_q$ with the feedback signals tending towards zero.

Specifically, the control law is a proportional or, more precisely, a proportional-integrative law.

With reference to the embodiment of FIG. 2, the function blocks 105, 106 represent respective portions of the control law, which in turn define corresponding control laws, in particular proportional or proportional-integrative, applied to the errors calculated in output from the blocks 103, 104, respectively.

Each of the blocks 105, 106 correspond to functions defining the respective control laws and configured to associate respective control signals $v_d^*$, $v_q^*$ with the errors related to the direct and quadrature currents, respectively.

The control signals $v_d^*$, $v_q^*$ are respectively representative of a direct and quadrature driving voltage to be applied on the motor 4.

Therefore, the control laws defined by the blocks 105, 106 apply gains or transfer functions to the errors, where the gains are adapted to transform electric currents into voltages and therefore potentially have a physical meaning or a unit of measurement of electric resistances.

The control unit 5 is configured (function block 108 in FIG. 2) to transform the control signals $v_d^*$, $v_q^*$ into further control signals $v_u^*$, $v_v^*$, $v_w^*$ representing the voltages corresponding to the three phases of the power supply current of the motor 4. For the transformation of the block 108, the control unit 5 uses the inverse of the transformation of the block 102.

To control the motor 4, the control unit 5 actually controls an inverter 8, which is electrically connected to the motor 4 and is configured to regulate the power supply voltage of the motor 4.

Specifically, the control unit 5 is configured to control the inverter 8, such that the power supply voltage and in particular its three phases $v_u$, $v_v$, $v_w$ correspond to the signals $v_u^*$, $v_v^*$, $v_w^*$.

In controlling the motor 4, the calculated errors can always be conveyed, if considered convenient, to a single error representative of the quality of the control, for example obtained as the average of the calculated errors or more preferably as the square root of the sum of the squared errors. Alternatively, even only one of the calculated errors can be considered representative of the entire quality of the control. In fact, thanks to the control laws, if one of the errors converges to zero, another error will probably also converge to zero. On the other hand, if one of the errors diverges, the motor 4 would in any case find itself in a situation of poor controllability or out of control.

Therefore, in the following, the description will refer to only one error, either the one obtained as a function of all the calculated errors or the one defined by any one of the calculated errors.

Potentially, the error referred to in the following description could also consist exclusively or in part of all of the calculated errors arranged in a vector or matrix element, whereby the vector or matrix element can also be interpreted conceptually and not restrictively as only a vector or matrix, but also as a set of information respectively relevant to the calculated errors. Therefore, in this case, the feedback signal can also be a vector or matrix signal, according to the same interpretation as the vector element described above. Clearly, the control targets $i^*_d$, $i^*_q$ and the associated control inputs can also be part of respective vector or matrix elements which define a single control target and a corresponding single control input, respectively.

The control unit 5 is configured to identify a critical condition where the error diverges relative to the zero value during the control of the motor 4. In other words, the critical condition is established and identified by the control unit 5 when the error diverges relative to the zero value.

In particular, the error diverges or is considered divergent when an increase in the error for a predetermined time interval exceeds, particularly in modulus, a critical threshold. Alternatively, the error could be considered divergent when it exceeds (e.g., in modulus) a critical threshold, or when it is always increasing (e.g., in modulus) over a predetermined time interval, or according to any other reasonable criterion, e.g., as a function of the aforesaid increment or a derivative of the error.

Therefore, the control unit 5 is configured to actually calculate the error and identify the divergence thereof, thus identifying the critical condition, in particular based on further calculations carried out by the control unit on the error values, which are in turn calculated by the control unit over time or more precisely in the predetermined time interval.

During the critical condition (preferably, but not necessarily during the critical condition), in addition to the target torque T*, the control unit 5 is configured to determine, e.g., at the same speed ω determined, a safety target torque lower than the target torque T*.

According to a first example, the safety target torque is less than or equal to a predetermined percentage of the target torque T*. The predetermined percentage could in turn be less than or equal to 90%, for example.

Without losing generality, the predetermined percentage could vary as a function of the speed ω determined.

Alternatively, preferably, the predetermined percentage is fixed, regardless of the speed ω determined.

In both cases, preferably but not necessarily, the safety target torque could belong to a predetermined safety characteristic curve 12, an example of which is provided in FIG. 4 with a dotted line.

The safety characteristic curve 12 is conceptually analogous to the safety characteristic curve 6 (viz., it is a torque-speed curve) but lowered relative thereto for all values of the speed ω. In other, more precise words, a maximum limit for the safety target torque, viz., a safety target torque in the characteristic curve 12 is lowered relative to the corresponding target torque limit in the characteristic curve 6 for any or all values of the speed ω.

More precisely, the curve 12 defines the safety target torque limit, viz., the maximum limit for the safety target torque, as a function of the speed ω. In other words, the curve 12 is a representation of a function which associates values of the speed ω or the speed ω with values of the safety target torque limit or at the safety target torque limit.

Preferably, the control unit 5 is configured to limit the safety control target to the safety target torque limit should the target torque exceed such a safety target torque limit.

The extent of lowering can be fixed for any value of the speed ω or variable with the speed ω, as depicted in FIG. 4.

For example, the target torque limit of the curve 12 can be lowered relative to the characteristic curve 6 by a percentage rate, e.g., less than or equal to 90%, for each of the values of the speed ω. In particular, but not necessarily, the percentage rate can be fixed for each of the values of the speed ω.

The safety target torque will correspond to one or more safety control targets by means of or according to the mapping of the block 101.

Therefore, the control unit 5 is configured to determine the safety control targets corresponding to the speed ω determined and corresponding to the safety target torque according to the mapping of the block 101.

In the critical condition, viz., when the critical condition is identified by the control unit 5, the latter is configured to replace the error with a safety error, which is indicative of a difference between one of the safety control objectives and the corresponding feedback signal.

In particular, this occurs indirectly; viz., the control unit 5 replaces the target torque T* with the safety target torque.

According to a non-limiting example, if the target torque and the safety target torque are limited to the respective limits defined by the curves 6, 12 for the same speed ω, the target torque and the safety target torque would be determined for the same speed ω by means of the characteristic curves 6, 12, respectively.

In FIG. 4, which refers to this last specific non-limiting example, the replacement of the target torque T* with the safety target torque is represented by an arrow from the target torque T* to the safety target torque, where the arrow extends in a straight line associated with a constant speed ω.

Therefore, the control targets $i^*_d$, $i^*_q$ are replaced by means of the block 101 by the safety control targets corresponding to the safety target torque.

Therefore, the error necessarily changes as one of the feedback signals is subtracted from one of the safety control targets, instead of one of the control targets $i^*_d$, $i^*_q$.

Thereby, the control target of the motor 4 becomes less ambitious in terms of performance, but more attainable due to the lowering of the target torque T*.

According to a further example, potentially combinable with the first example, the lowering of the target torque T* occurs iteratively during the control of the motor 4.

In more detail, the target torque is progressively reduced with each iteration until the critical condition ceases to exist.

In particular, each iteration corresponds to a predetermined time interval, which can be fixed or variable, without losing generality.

Specifically, for each iteration, the control unit 5 verifies that at the end of the predetermined time interval the error has fallen below a safety threshold, or that an error increment falls below the critical threshold, or even that an error decrement exceeds a threshold. In fact, the occurrence of one of the conditions listed in this paragraph in an alternative manner could coincide with the cessation of the critical condition.

Alternatively, the verification could be carried out at the beginning of each iteration or during an intermediate instant of the corresponding time interval.

In practice, the critical condition ceases when the error tends to converge to zero. The alternative conditions listed are therefore considerable as representative of the tendency of the error to converge to zero.

In other words, at each iteration, the control unit 5 identifies whether the critical condition exists.

If the critical condition does not exist, the iterative process ends.

Conversely, the control unit determines the safety control target corresponding to the safety target torque (according to the mapping of the block 101) which is reduced relative to the previous iteration.

Therefore, the error is replaced with the relevant safety error of the iteration.

In general, preferably, the target torque T* will be used again, following the replacement of the error, after or on the expiration of a predetermined time from the replacement.

Therefore, the control unit 5 is configured to replace the safety error with the error before the expiration of the predetermined time.

Thereby, the control unit 5 controls the motor 4 again with the aim of maximising the performance of the motor vehicle 1, after having coped with a loss of control due to the error replacement.

In view of the above, the control unit 5 is configured to carry out a process for controlling the motor 4.

The process comprises the steps of a. determine the target torque T* to be delivered by the electric motor 4 according to the driver's demand, b. associating the determined target torque T* with at least one corresponding control target $i^*_d$ or $i^*_q$ for a control input of the electric motor 4 according to a mapping between the target torque T* and the control target $i^*_d$ or $i^*_q$, c. c. acquiring a feedback signal of the control input, d. controlling the electric motor 4 according to a control law as a function of an error indicative of a difference between the feedback signal and the control target $i^*_d$ or $i^*_q$, where the control law is configured to induce convergence of the error to a zero value, e. e. identifying a critical condition where the error diverges from the zero value during step d., f. determining a safety control target corresponding to a safety target torque according to the mapping, wherein the safety target torque is reduced relative to that determined in step a., and g. replacing the error in step d., when the critical condition is identified according to step e., with a safety error indicative of a further difference between the feedback signal and the safety control target.

For example, the safety target torque is less than or equal to a predetermined percentage, e.g., 90%, of the target torque T* determined in step a.

Conveniently, the process comprises determining the output speed ω of the electric motor 4 and providing the optimised characteristic curve 6 of the electric motor 4, where the optimised characteristic curve 6 defines a functional relationship between the output speed ω of the electric motor 4 and the target torque limit, the target torque T* being limited to the target torque limit corresponding to the determined speed ω. In particular, the target torque limit is or defines a cutoff for the target torque T*

Preferably, the process further comprises determining the safety characteristic curve 12 by lowering the optimised characteristic curve 6 for all values of the output speed ω, where the safety characteristic curve 12 defines a functional relationship between the output speed ω of the electric motor 4 and the safety target torque limit, the safety target torque being limited to the safety target torque limit corresponding to the determined speed ω. In particular, the safety target torque limit is or defines a cutoff for the safety target torque.

For example, the target torque limit of the safety characteristic curve 12 could be lowered relative to the target torque limit of the optimised characteristic curve 6 according to a fixed or variable rate for each of the output speed ω values.

Preferably, the steps e., f., g., can be carried out iteratively during step d. by progressively reducing the safety target torque for each iteration until the critical condition ceases to be identified in step e.

In particular, as mentioned above, the critical condition is identified in step e. when the error increment for the predetermined time interval exceeds the critical threshold.

Preferably, as mentioned above, the control input comprises an electric current to supply the motor 4 or supplying the motor 4.

Furthermore, the process conveniently comprises step j. of again replacing the safety error in step d. with the previous error upon the expiration of a predetermined time from carrying out step g.

From the above, the advantages of the motor vehicle 1 and of the process according to the invention are obvious.

Due to the lowering of the target torque T* at the moment of the critical condition, viz., in a condition of poor controllability of the motor vehicle 1, the same controllability is recovered after a short time, without the need to stop the motor vehicle 1 or introduce a speed limiter.

Simply, the performance of the motor vehicle 1 suffers a slight drop, which is not however comparable to a stopped state of the motor vehicle or significant speed limitation conditions.

In fact, the driver has no need to bring the motor vehicle 1 to a garage; rather, the driver can simply wait for the critical condition to cease, so that he/she can safely resume driving the motor vehicle 1 in peak performance conditions should the critical condition be transient, e.g., due to unfavourable operating conditions.

Finally, it is clear that modifications and variations can be made to the motor vehicle 1 and to the process according to the invention without, however, departing from the scope of protection defined by the claims.

In particular, the number of control targets, as well as the number of feedback signals and errors, could differ relative to what is described and illustrated.

The invention claimed is:

1. A process for controlling an electric motor of a motor vehicle, the process comprising the steps of:

a. determining a target torque to be delivered by the electric motor as a function of a corresponding demand of a driver of the motor vehicle;

b. associating the determined target torque with at least one corresponding control target for a control input of the electric motor according to a mapping between the target torque and the control target;

c. acquiring a feedback signal of the control input;

d. controlling the electric motor according to a control law as a function of an error indicative of a difference between the feedback signal and the control target, wherein the control law is configured to induce convergence of the error to a zero value;

e. identifying a critical condition where the error diverges from the zero value during step d.;

f. determining a safety control target corresponding to a safety target torque according to said mapping, wherein the safety target torque is reduced relative to the target torque determined in step a.; and g. replacing said error in step d., when the critical condition is identified according to step e., with a safety error indicative of a further difference between the feedback signal and the safety control target.

2. The process according to claim 1, wherein the safety target torque is less than or equal to a predetermined percentage of the target torque determined in step a.

3. The process according to claim 2, wherein the predetermined percentage is 90%.

4. The process according to claim 1, further comprising determining an output speed of the electric motor and having an optimized characteristic curve of the electric motor, the optimized characteristic curve defining a functional relationship between the output speed of the electric motor and a target torque limit, wherein the determined target torque is limited to the target torque limit corresponding to the determined output speed, according to the optimized characteristic curve.

5. The process according to claim 4, further comprising determining a safety characteristic curve by lowering the optimized characteristic curve for all values of the output speed, the safety characteristic curve defining a functional relationship between the output speed and a safety target torque limit, wherein the determined safety target torque limit is limited to the safety target torque limit corresponding to the determined output speed, according to the safety characteristic curve.

6. The process according to claim 1, wherein steps e., f., g. are performed iteratively during step d. progressively reducing the safety target torque for each iteration until the critical condition ceases to be identified in step e.

7. The process according to claim 1, wherein the critical condition is identified in step e. when an increment of the error for a predetermined time interval exceeds a critical threshold.

8. The process according to claim 1, wherein the control input comprises an electric current to supply the electric motor.

9. The process according to claim 1, further comprising the step of replacing again the safety error in step d. with said error at the expiration of a predetermined time from the execution of step g.

10. A motor vehicle comprising an electric motor and a control unit configured to carry out the process according to claim 1.

11. A process for controlling an electric motor of a motor vehicle, the process comprising:

determining a target torque to be delivered by the electric motor as a function of a corresponding demand of a driver of the motor vehicle;

associating the determined target torque with at least one corresponding control target for a control input of the electric motor according to a mapping between the target torque and the control target;

acquiring a feedback signal of the control input;

controlling the electric motor according to an algorithm as a function of an error indicative of a difference between the feedback signal and the control target, wherein the algorithm is configured to induce convergence of the error to a zero value;

identifying a critical condition where the error diverges from the zero value during said controlling step;

determining a safety control target corresponding to a safety target torque according to said mapping, wherein the safety target torque is reduced relative to the determined target torque; and replacing said error in said controlling step, when the critical condition is identified according to said identifying step, with a safety error indicative of a further difference between the feedback signal and the safety control target.

* * * * *